CRYSTAL DIODE RECTIFIER AND METHOD OF MAKING SAME

Filed Dec. 24, 1956

Inventors:
John G. Hambor,
Carson Weaver,
by Arthur D. Thomson
Attorney

United States Patent Office 2,984,890
Patented May 23, 1961

2,984,890

CRYSTAL DIODE RECTIFIER AND METHOD OF MAKING SAME

John G. Hambor and Carson Weaver, Greenville, R.I., assignors to Gahagan, Inc., Esmond, R.I., a corporation of Pennsylvania Filed Dec. 24, 1956, Ser. No. 630,166
1 Claim. (Cl. 29—25.3)

This invention relates to electrical current rectifiers and more particularly to the type of rectifiers which employ semi-conductive crystals of germanium or silicon, for example, as the rectifying element.

Conventional germanium and silicon diodes exhibit a phenomenon known as "enhancement current" when the voltage applied to the diode is suddenly reversed from the forward, or low resistance direction, to the back, or high resistance direction. This enhancement current, which is of a transient nature, is a function of the magnitude and duration of the forward conducting current and at 0.1 microsecond after reversal of applied voltage may be of the order of hundreds of times greater than the current indicated by D.C. measurement at the same value of reverse voltage. The time required for the enhancement current to die out or, in other words, for the back resistance of the diode to return to normal, is referred to as the "recovery time." In high frequency switching applications, such as computer circuits, for example, the recovery time of a diode is of utmost importance, as it limits the speed of operation which can be achieved. In a computor employing several thousand diodes, crystal diodes have marked advantages over vacuum tube diodes. Use of crystal diodes in such a system permits very substantial reduction in the size, cost, complexity, power consumption, and heat dissipation problem. Where very high operating speed is required, however, it has heretofore been necessary to use vacuum tubes, because of the limitations imposed by the existence of the enhancement current phenomenon in crystal diodes. On the other hand, a vacuum tube computer may be many times the size of a comparable diode computer, and is thus out of the question for applications where size and weight are critical factors.

One of the principal objects of this invention is to provide a crystal diode in which enhancement current is substantially reduced, both in peak magnitude and duration, to such an extent that the recovery time of the diode may be considered insignificant for present computer designs. Another object is to provide a method of manufacturing diodes having consistently low enhancement current characteristics. Other objects and advantages of the invention will be apparent from the following description.

In the drawings illustrating the invention:

Figure 1:
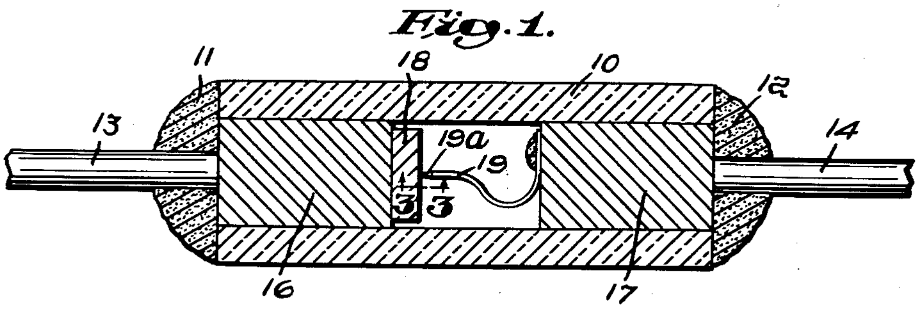
Fig. 1 is a cross-section, greatly enlarged from actual size, of a germanium diode constructed according to the invention.

As shown in Fig. 1, the working parts of the diode are enclosed in a tubular casing 10 which may be made of ceramic, plastic, or metal, suitably insulated. The ends of the casing are closed by solder sealing plugs 11 and 12 through which the lead wires 13 and 14 are brought in. The leads are butt-welded to nickel studs 16 and 17, respectively, which serve as the electrodes of the diode. A block 18 made of N-type monocrystal germanium, for example, prepared in the usual manner, is soft soldered to electrode 16. The exposed face of the germanium block is chemically etched, prior to final assembly, to produce a clean surface. A fine whisker wire 19 is welded to electrode 17 and its left-hand end 19A, which is brought to a sharp point, is engaged with the face of block 18.

The parts of the diode, as thus far described, are of generally conventional construction and mechanical arrangement. In conventional diodes, however, the whisker wire is made of metals such as gold, platinum, or tungsten. For reasons which will be later explained, the whisker wire in this case is made of pure copper, or an alloy, containing a substantial amount of copper.

After assembly, the diode is electrically treated or "formed" by passing several A.C. or D.C. pulses of relatively high current, in the order of one-fourth of an ampere to one ampere, through the diode. The pulses should be of a duration of one-tenth of a second to one second. One pulse might be sufficient in some cases, but two to five pulses may be required to insure consistent results.

Figure 2:
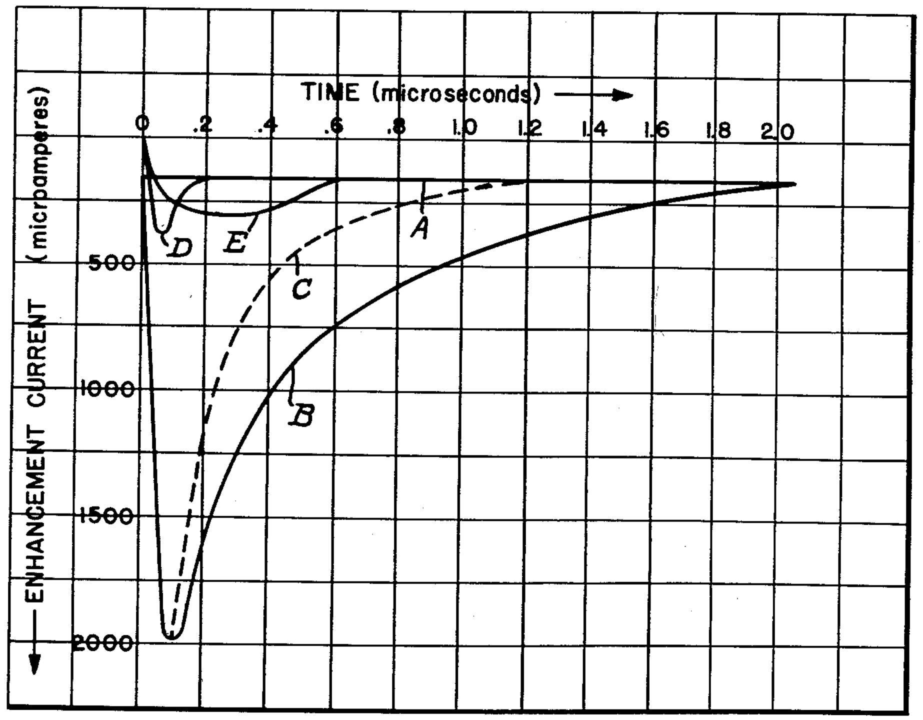
Fig. 2 is a graph illustrating enhancement current as a function of time for conventional diodes and diodes manufactured according to the invention.

Fig. 2 illustrates the results of the electrical forming on a diode using a copper whisker wire. The line A represents the back current level through the diode under steady D.C. conditions. The curve B represents the enhancement current of a diode, using a copper whisker wire, prior to the electrical forming. This curve was obtained by use of the following standard test set-up. The diode was connected in series with a load resistance of 2,000 ohms and capacitance of 60 micro-microfarads, and subjected to a 50 kilocycle square wave generated in a type 105 Tektronix Square Wave Generator fed to a Hauman Model ND–1 Standard Diode Pulse Recovery Test Set, using a 30 milliampere forward current and reversing the voltage to 35 volts. The recovery time pattern was viewed on a Type 531 Tektronix Oscilloscope.

Curve B is also fairly representative of the enhancement current characteristics of many conventional germanium diodes using tungsten, gold, or platinum whisker wires. Curve C represents the characteristics of conventional diodes which meet one of the typical specifications for computer work, which requires the enhancement current to decay to less than 700 microamperes at 0.3 microsecond. Conventional diodes which meet these specifications generally exhibit high peak enhancement currents. Some conventional diodes are occasionally found on test to have very low enhancement currents, but these specimens must be regarded as freaks.

Curves D and E represent typical enhancement patterns for diodes with copper whisker wires after the electrical forming process. Curve D exemplifies the results obtained by forming with shorter, higher voltage pulses, and characteristics represented by curve E are obtained by forming with longer low voltage pulses. In such case it will be noted that not only is the recovery time substantially reduced, but the peak enhancement current is very much lower than that of the diode before forming, or that of conventional diodes. If the diodes are to be used in a circuit in which the operating tolerances are such that a back current up to 700 microamperes at 0.3 microsecond, for example, will not result in faulty operation, it is apparent that the formed diodes may be operated as if their recovery time characteristics were zero, because even in their peak enhancement, current is well below the tolerance limit.

The explanation of the results achieved by manufacturing diodes in the manner just described is as follows: The enhancement current phenomenon is believed to be due to the presence in the crystal in the immediate vicinity of the P-N junction of stored positive charge commonly referred to as "holes" produced through the process of hole injection while the diode is operating in its conducting or forward direction. These "holes" are commonly referred to as minority carriers, and the length of time they exist (referred to as "lifetime") is dependent on the length of time required to neutralize the hole positive charge with negative charge associated with electrons or traps.

During the time required for the minority carriers to recombine with electrons and traps after the voltage is reversed, the crystal has relatively low back resistance. The recovery time, or time for the crystal to return to its normal back resistance condition, is determined by the speed of recombination of the minority carriers.

It is known that copper produces in germanium acceptor levels at activated energies of 0.04 ev. and 0.25 ev. and that the acceptor level at 0.25 ev. also acts as a recombination center or trap. The presence of copper in germanium is known to cause "thermal conversion," that is, a change from N-type germanium to P-type germanium, or conversely, P-type germanium to N-type germanium by the simple process of quenching or heat treating at elevated temperatures. Probably because of the thermal conversion phenomena, introduction of copper into germanium has been greatly avoided.

In the new diode, the copper whisker wire, which is typically on the order of .004 inch in diameter, is brought to a sharp point, for example to about .001 inch in diameter, where it engages the crystal. It is apparent that a current in the neighborhood of a quarter of an ampere or more, passing through this small area, will quickly raise the temperature of the copper and germanium contact area to over 800° C. at which temperature diffusion of copper atoms into germanium takes place rapidly. It is known that copper has a remarkably high diffusion constant on the order of $10^{-5}$ $cm.^2/sec.$ at 800° C. Because of the very small area of contact and the high diffusion constant of copper into germanium, it is possible through the use of controlled current pulses to limit the copper diffusion into germanium to the small P-N junction region of the diode without affecting the large bulk of the N-type germanium crystal.

Figure 3:
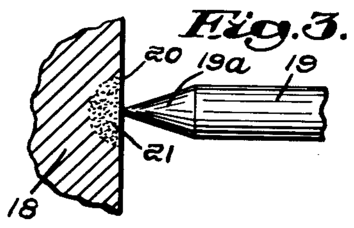
Fig. 3 is an idealized, greatly magnified, cross-section taken along line 3—3 of Fig. 1.

Fig. 3 shows schematically the apparent structure in the region of the P-N junction after forming. In the region marked 20, copper atoms 21 have been diffused into the crystal. It is believed that copper diffuses into germanium both substitutionally and interstitially at temperatures above 800° C., thus making it possible to saturate the P-N junction region with copper atoms. These copper atoms acting as recombination centers or traps greatly reduce the lifetime of the minority carriers, resulting in fast recombination of the minority carriers after reversal of the voltage across the diode to the back or non-conducting direction, thereby greatly reducing enhancement current.

The size of whisker wire here given is representative for diodes having a germanium crystal approximately .045 inch by .045" by .015 inch having a resistivity in the order of one to fifteen ohms per centimeter. The size of the point on the wire may be varied as long as it remains small enough to be negligible in comparison to the size of the crystal face.

The above explanation of the behavior of the diode is based on present theories and may not be a full or exact explanation. It has been found, however, that conventional diodes having tungsten, plantinum or gold whisker wires do not respond in the desired manner when subjected to the same electric forming process. In fact, in many cases, repeated pulsing of diodes with current in excess of normal operating values appears to make the enhancement current and recovery time characteristics worse. It has also been found that a trace or thin plating of copper on the wire is not sufficient for consistent results. A minimum content of about 30% copper is required.

The particular shape of the pulses used in the forming operation is not critical. In general, however, it is desirable to bring the junction area up to diffusion temperature somewhat gradually to avoid spattering, and to quench the pulse quickly to avoid overheating. For these considerations a saw tooth wave form, or something approaching this form, is preferable. As previously stated, manufacture of germanium diodes by the methods of construction described above will produce germanium diodes exhibiting low enhancement current and fast recovery of back resistance in fast switching applications. The utilization of the new diode in computer applications may result in the design of new computers capable of operating at such higher speeds than present computers utilizing germanium diodes.

In the design of germanium mixer diodes used in mixer applications over the range of frequencies from 400 megacycles to 30,000 megacycles, it has been found that considerable improvement in performance is obtained by using the methods of construction described above. It is believed that considerable reduction in undesirable noise and conversion loss is due to the reduction of enhancement current which, in turn, is due to the fact recombination of the injected minority carriers.

What is claimed is:

The method of manufacturing crystal rectifiers which comprises assembling together a crystal having a contact face with a contact element containing a substantial amount of copper so that the element engages a limited portion of said face, and applying through said element and said crystal current pulses of a magnitude in the range of one-quarter to one ampere of a duration in the range of .1 second to one second.

References Cited in the file of this patent

UNITED STATES PATENTS

| | | |
|---|---|---|
| 2,524,035 | Bardeen et al. | Oct. 3, 1950 |
| 2,577,803 | Pfann | Dec. 11, 1951 |
| 2,650,311 | Bray et al. | Aug. 25, 1953 |
| 2,653,374 | Mathews et al. | Sept. 29, 1953 |
| 2,666,977 | Pfann | Jan. 26, 1954 |
| 2,671,156 | Douglass et al. | Mar. 2, 1954 |
| 2,697,269 | Fuller | Dec. 21, 1954 |
| 2,701,326 | Pfann et al. | Feb. 1, 1955 |
| 2,709,780 | Kircher | May 31, 1955 |
| 2,813,233 | Shockley | Nov. 12, 1957 |
| 2,829,422 | Fuller | Apr. 8, 1958 |